(12) United States Patent
Cheng et al.

(10) Patent No.: US 10,394,333 B2
(45) Date of Patent: Aug. 27, 2019

(54) DISPLAY CONTROL CIRCUIT, DISPLAY CONTROL METHOD AND DISPLAY DEVICE

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Peng Cheng, Beijing (CN); Shuhuan Yu, Beijing (CN); Junning Su, Beijing (CN); Jianzi He, Beijing (CN); Haiyan Wan, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/512,490

(22) PCT Filed: May 11, 2016

(86) PCT No.: PCT/CN2016/081662
§ 371 (c)(1),
(2) Date: Mar. 17, 2017

(87) PCT Pub. No.: WO2017/156852
PCT Pub. Date: Sep. 21, 2017

(65) Prior Publication Data
US 2018/0373340 A1 Dec. 27, 2018

(30) Foreign Application Priority Data
Mar. 16, 2016 (CN) .......................... 2016 1 0150862

(51) Int. Cl.
*G06F 3/01* (2006.01)
*G09G 3/20* (2006.01)
(Continued)

(52) U.S. Cl.
CPC .............. *G06F 3/017* (2013.01); *G01S 7/415* (2013.01); *G01S 13/88* (2013.01); *G06F 3/01* (2013.01); *G09G 3/20* (2013.01); *G09G 2354/00* (2013.01)

(58) Field of Classification Search
CPC ........ G06F 3/017; G06F 3/011; G06F 3/0416; G06F 3/044; G06F 3/04883; G06F 3/041; (Continued)

(56) References Cited

U.S. PATENT DOCUMENTS

2007/0263907 A1* 11/2007 McMakin ............. G01S 13/887
382/115
2008/0005703 A1 1/2008 Radivojevic et al.
(Continued)

FOREIGN PATENT DOCUMENTS

CN 101730874 A 6/2010
CN 102782612 A 11/2012
(Continued)

OTHER PUBLICATIONS

First Office Action for Chinese Application No. 201610150862.1, dated Dec. 14, 2017, 7 Pages.
(Continued)

*Primary Examiner* — Premal R Patel
(74) *Attorney, Agent, or Firm* — Brooks Kushman P.C.

(57) ABSTRACT

A display control circuit, a display control method and a display device are provided. The display control circuit includes a gesture identifying unit and a display control unit. The gesture identifying unit includes a millimeter wave signal transceiver module and a gesture detector. The millimeter wave signal transceiver module is configured to transmit a first millimeter wave signal and receive a second millimeter wave signal that is reflected back. The gesture detector is configured to process and identify the second
(Continued)

millimeter wave signal, to detect a gesture within a predetermined range around the display panel. The display control unit is configured to control the display panel based on the gesture.

20 Claims, 2 Drawing Sheets

(51) Int. Cl.
*G01S 7/41* (2006.01)
*G01S 13/88* (2006.01)

(58) Field of Classification Search
CPC .............. G06F 3/0346; G06F 3/0425; G06F 2203/0383; G06F 2203/04104; G06F 3/014; G06F 3/0304; G06F 3/0325; G06F 3/03547; G01S 7/415; G01S 13/88
See application file for complete search history.

(56) References Cited

U.S. PATENT DOCUMENTS

| | | | |
|---|---|---|---|
| 2010/0289772 A1* | 11/2010 | Miller | G06F 3/0421 345/175 |
| 2011/0181510 A1* | 7/2011 | Hakala | G06F 3/017 345/158 |
| 2015/0199021 A1* | 7/2015 | Jeon | G06F 3/04817 345/158 |
| 2015/0346820 A1 | 12/2015 | Poupyrev et al. | |
| 2015/0347821 A1 | 12/2015 | Choi et al. | |
| 2016/0054803 A1* | 2/2016 | Poupyrev | G06F 3/017 345/156 |
| 2016/0098089 A1* | 4/2016 | Poupyrev | G06F 3/0304 345/156 |
| 2016/0144785 A1 | 5/2016 | Shimizu et al. | |
| 2016/0277159 A1* | 9/2016 | Hillenius | H04L 5/006 |
| 2016/0320852 A1* | 11/2016 | Poupyrev | G06F 3/0325 |
| 2016/0364006 A1 | 12/2016 | Zhang | |

FOREIGN PATENT DOCUMENTS

| | | |
|---|---|---|
| CN | 104868897 A | 8/2015 |
| CN | 104898844 A | 9/2015 |
| CN | 105258444 A | 1/2016 |
| CN | 105278674 A | 1/2016 |
| CN | 105378813 A | 3/2016 |
| CN | 205427771 U | 8/2016 |
| JP | 2015060518 A | 3/2015 |

OTHER PUBLICATIONS

International Search Report and Written Opinion for Application No. PCT/CN2016/081662, dated Oct. 28, 2016, 10 Pages.

* cited by examiner

DISPLAY CONTROL CIRCUIT, DISPLAY CONTROL METHOD AND DISPLAY DEVICE

CROSS-REFERENCE TO RELATED APPLICATIONS

This application is the U.S. national phase of PCT Application No. PCT/CN2016/081662 filed on May 11, 2016, which claims priority to Chinese Patent Application No. 201610150862.1 filed on Mar. 16, 2016, the disclosures of which are incorporated in their entirety by reference herein.

TECHNICAL FIELD

The present disclosure relates to the field of display technology, and in particular to a display control circuit, a display control method and a display device.

BACKGROUND

In the related art, a non-contact control of a display panel is commonly achieved by using a camera or an infrared optical technology. However, a camera or an infrared optical identifying unit may not be shielded when a gesture of a user is identified by using a camera or an infrared optical technology, so it is required to arrange an unshielded opening additionally in the outer frame of the display device, so as to identify the gesture. As a result, an appearance of the display device may be adversely affected. In addition, the accuracy of the non-contact control of the display panel may be lowered due to the fact that a close-in gesture may not be identified accurately by using the camera or the infrared optical technology.

Further, transparent display devices are springing up in the market, which brings a user with a better vision experience. However, most of the transparent display devices may only provide a simple display function instead of providing a better interactive experience. Although a capacitive touch transparent display device has already existed in the related art, the transparent display panel of such capacitive touch transparent display device is of a low transmittance and requires a back light source with high intensity, so it is easy to dirty the transparent display panel.

SUMMARY

An object of the present disclosure is to provide a display control circuit, a display control method and a display device, so as to accurately detect the gesture within the predetermined range around the display panel, and improve the appearance of the display device which is adversely affected due to the unshielded opening arranged in the display device in the related art.

In one aspect, the present disclosure provides in some embodiments a display control circuit for controlling a display panel, wherein the display control circuit includes: a gesture identifying unit including a millimeter wave signal transceiver module and a gesture detector, wherein the millimeter wave signal transceiver module is configured to transmit a first millimeter wave signal and receive a second millimeter wave signal that is reflected back, and the gesture detector is configured to process and identify the second millimeter wave signal, to detect a gesture within a predetermined range around the display panel; and a display control unit configured to control the display panel based on the gesture.

Optionally, the display panel is a transparent display panel.

Optionally, the gesture detector is further configured to identify at least one of a movement direction, a movement speed and a movement distance in regard to the gesture; and the display control unit is further configured to control the display panel based on the at least one of the movement direction, the movement speed and the movement distance in regard to the gesture.

Optionally, the millimeter wave signal transceiver module includes a transceiver antenna, and the gesture detector includes a transceiver front-end module and a signal processing module. The transceiver front-end module is configured to generate the first millimeter wave signal. The transceiver antenna is configured to transmit the first millimeter wave signal and receive the second millimeter wave signal that is reflected back. The transceiver front-end module is further configured to process the second millimeter wave signal to obtain an intermediate-frequency signal. The signal processing module is configured to amplify the intermediate-frequency signal, and detect the gesture within the predetermined range around the display panel based on the amplified intermediate-frequency signal.

Optionally, a frequency of the intermediate-frequency signal is larger than or equal to 5 kilohertz and smaller than or equal to 1 megahertz.

Optionally, the transceiver front-end module includes: a voltage-controlled oscillator configured to generate the first millimeter wave signal in response to an external modulating signal; a mixer configured to mix frequencies of the second millimeter wave signal and a local oscillator signal, to obtain a frequency-mixed signal; and a band-pass filter configured to subject the frequency-mixed signal to a band-pass filtering process, to obtain the intermediate-frequency signal.

Optionally, the transceiver front-end module further includes: a signal isolator, connected to each of the transceiver antenna, the voltage-controlled oscillator and the mixer, and configured to isolate the first millimeter wave signal and the second millimeter wave signal from each other, transmit to the transceiver antenna the first millimeter wave signal transmitted from the voltage-controlled oscillator, and transmit to the mixer the second millimeter wave signal transmitted from the transceiver antenna.

Optionally, the signal processing module includes: a low-noise preamplifier configured to subject the intermediate-frequency signal to a low noise amplifying process; an automatic gain control amplifier configured to subject the intermediate-frequency signal subjected to the low noise amplifying process to an automatic gain control amplifying process; a high-gain amplifier configured to subject the intermediate-frequency signal subjected to the automatic gain control amplifying process to a high-gain amplifying process; and a digital signal processor configured to detect the gesture within the predetermined range around the display panel based on the intermediate-frequency signal subjected to the high-gain amplifying process, and identify the at least one of the movement direction, the movement speed and the movement distance in regard to the gesture.

Optionally, the predetermined range is within 1 meter from the display panel.

In another aspect, the present disclosure provides in some embodiments a display control method including: a millimeter wave signal transceiving step of, transmitting, by a millimeter wave signal transceiver module, a first millimeter wave signal, and receiving, by the millimeter wave signal transceiver module, a second millimeter wave signal that is reflected back; a gesture detecting step of, processing and identifying, by a gesture detector, the second millimeter wave signal to detect a gesture within a predetermined range around the display panel; and a display controlling step of, controlling, by a display control unit, the display panel based on the gesture.

Optionally, the gesture detecting step further includes: identifying, by the gesture detector, at least one of a movement direction, a movement speed and a movement distance in regard to the gesturer; and the display controlling step further includes: controlling, by the display control unit, the display panel based on the at least one of the movement direction, the movement speed and the movement distance in regard to the gesture.

In yet another aspect, the present disclosure further provides in some embodiments a display device including a display panel and the above display control circuit.

Optionally, the gesture identifying unit is arranged at an edge or a corner of the display device.

In compared with the related art, according to the display control circuit, the display control method and the display device in the present disclosure, it is capable of accurately detecting a gesture within a predetermined range around the display panel by using the gesture identifying unit based on the millimeter wave radar technology. As a result, even if being shielded, the gesture identifying unit may still detect the gesture within a predetermined range around the display panel. Therefore, in compared with the related art, the non-contact control of the display panel may be achieved without additionally arranging an unshielded opening on the display device.

BRIEF DESCRIPTION OF THE DRAWINGS

In order to illustrate the technical solutions of the present disclosure or the related art in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort. Sizes and the like of the members in the drawings are for illustrative purposes only, but shall not be used to reflect any actual scale.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
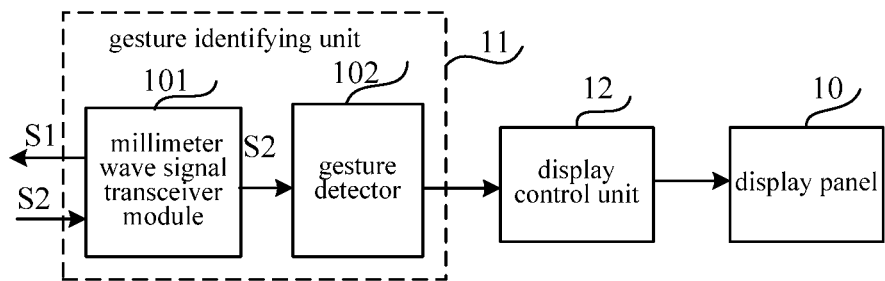
FIG. 1 is a schematic view showing a display control circuit in some embodiments of the present disclosure.

As shown in FIG. 1, a display control circuit is provided in some embodiments of the present disclosure, configured to control a display of a display panel 10. The display control circuit includes a gesture identifying unit 11 and a display control unit 12. The gesture identifying unit 11 includes a millimeter wave signal transceiver module 101 and a gesture detector 102. The millimeter wave signal transceiver module 101 is configured to transmit a first millimeter wave signal S1 and receive a second millimeter wave signal S2 that is reflected back. The gesture detector 102 is configured to process and identify the second millimeter wave signal S2, to detect a gesture within a predetermined range around the display panel. The display control unit 12 is configured to control the display panel 10 based on the gesture.

For example, when the gesture identifying unit detects the gesture, the gesture may be achieved by using an input tools such as a hand (including figures) of a user. The gesture identifying unit detects the gesture based on the millimeter wave radar technology, and is capable of detecting a plurality of gestures simultaneously or in sequence.

According to the embodiments of the present disclosure, the display control circuit is capable of accurately detecting a gesture within a predetermined range around the display panel by using the gesture identifying unit based on the millimeter wave radar technology. As a result, even if being shielded, the gesture identifying unit may still detect the gesture within a predetermined range around the display panel. Therefore, in compared with the related art, the non-contact control of the display panel may be achieved without additionally arranging an unshielded opening on the display device.

In compared with the gesture identifying technology in the related art achieved by using a camera or infrared ray, the display control circuit in the embodiments of the present disclosure is of a lower cost and has a simple and nice-looking appearance, and an anti-interference capability of the display device in the embodiments of the present disclosure is stronger than a device with a optical non-contact touch control function.

In some embodiments of the present disclosure, the gesture identifying unit of the display control circuit, which is based on the millimeter wave radar technology, may be arranged at an edge or a corner of the display device as needed, and it is not required to form an additional opening in the outer frame of the display device, so that that display device may have a nice-looking appearance.

During an actual implementation, the gesture identifying unit 11 detects a gesture within a predetermined range around the display panel, e.g., a gesture made by the user within 1 meter from the display panel, but the present disclosure is not limited thereto.

Optionally, the display panel may be a transparent display panel, and the non-contact control of the transparent display panel is achieved based on the millimeter wave radar technology, so as to improve a transmittance of the transparent display panel and reduce a power consumption of the back light source. In addition, the transparent display panel is controlled without being touched, so as to reduce a contamination of or a pressure damage to the transparent display panel.

In some embodiments of the present disclosure, the gesture detector may identify at least one of a movement direction, a movement speed and a movement distance in regard to the gesture, and the display control unit may control the display panel based on the at least one of the movement direction, the movement speed and the movement distance in regard to the gesture.

In the embodiments of the present disclosure, during an actual implementation, by using the millimeter wave radar capable of tracking and identifying close-in targets accurately, the display control circuit tracks and identifies the gesture, captures at least one of signals of the movement direction, the movement speed, the movement distance and the like in regard to the gesture, and defines the captured signal, such that the user may operate the display panel without touching the same.

Figure 2:
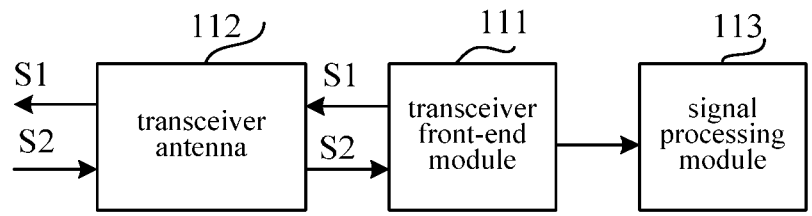
FIG. 2 is a schematic view showing a gesture identifying unit of a display control circuit in some embodiments of the present disclosure.

To be specific, as shown in FIG. 2, the millimeter wave signal transceiver module may include a transceiver antenna 112, and the gesture detector may include a transceiver front-end module 111 and a signal processing module 113. The transceiver front-end module 111 is configured to generate the first millimeter wave signal S1. The transceiver antenna 112 is configured to transmit the first millimeter wave signal S1 and receive the second millimeter wave signal S2 that is reflected back. The transceiver front-end module 111 is further configured to process the second millimeter wave signal S2 to obtain an intermediate-frequency signal. The signal processing module 113 is configured to amplify the intermediate-frequency signal and detect the gesture within the predetermined range around the display panel based on the amplified intermediate-frequency signal.

As shown in FIG. 2, in the gesture identifying unit in some embodiments, the transceiver antenna 112 is configured to transmit and receive the millimeter wave signals, and the transceiver front-end module 111 is a key component of the gesture identifying unit, which is mainly configured to generate the first millimeter wave signal, and demodulate and process the received second millimeter wave signal to obtain the intermediate-frequency signal. The first millimeter wave signal is a modulated radio-frequency signal. The signal processing module 113 is configured to amplify the intermediate-frequency signal transmitted from the transceiver front-end module 111, and detect the gesture within the predetermined range around the display panel based on the amplified intermediate-frequency signal. The structures of the transceiver front-end module 111 and the signal processing module 113 will be described in details in the following embodiments.

To be specific, a frequency of the intermediate-frequency signal is larger than or equal to 5 kilohertz (KHz) and smaller than or equal to 1 megahertz (MHz).

Figure 3:
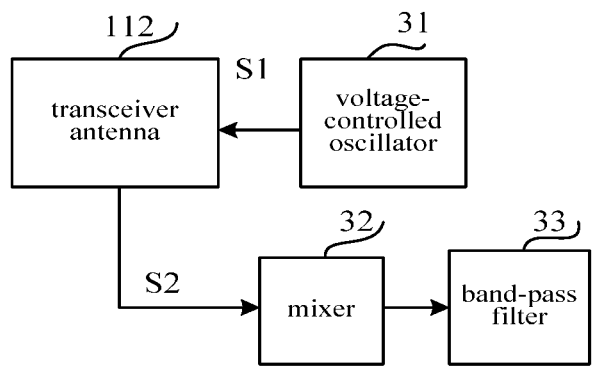
FIG. 3 is a schematic view showing a transceiver front-end module of a gesture identifying unit of a display control circuit in some embodiments of the present disclosure.

In some embodiments of the present disclosure, as shown in FIG. 3, the transceiver front-end module may include: a voltage-controlled oscillator 31 configured to generate the first millimeter wave signal S1 in response to an external modulating signal and transmit the first millimeter wave signal S1 to the transceiver antenna 112; a mixer 32 configured to mix the second millimeter wave signal S2 transmitted from the transceiver antenna 112 and a local oscillator signal to obtain a mixed signal; and a band-pass filter 33, configured to subject the mixed signal to a band-pass filtering process, to obtain the intermediate-frequency signal.

The voltage-controlled oscillator 31 generates the first millimeter wave signal S1 in response to the external modulating signal and transmits the first millimeter wave signal S1 to the transceiver antenna 112, such that the first millimeter wave signal S1 may be transmitted through the transceiver antenna 112, the mixer 32 mixes the received second millimeter wave signal S2 and the local oscillator signal, and then the band-pass filter 33 filters the mixed signal, so as to obtain the mixed signal.

Figure 4:
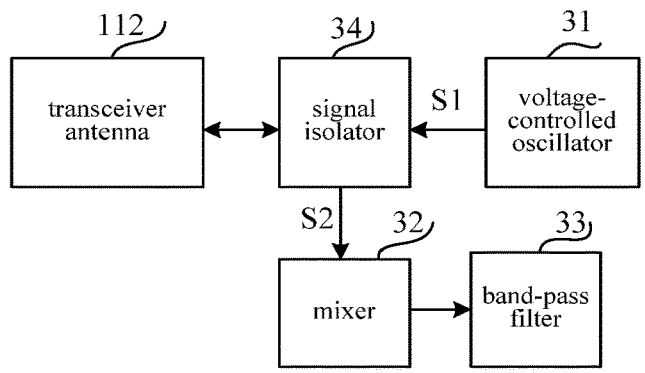
FIG. 4 is a schematic view showing a transceiver front-end module of a gesture identifying unit of a display control circuit in some embodiments of the present disclosure.

In some embodiments of the present disclosure, as shown in FIG. 4, the transceiver front-end module of the embodiment of FIG. 3 may further include: a signal isolator 34, connected to each of the transceiver antenna 112, the voltage-controlled oscillator 31 and the mixer 32, and configured to isolate the first millimeter wave signal S1 and the second millimeter wave signal S2 from each other, transmit to the transceiver antenna 112 the first millimeter wave signal S1 transmitted from the voltage-controlled oscillator 31, and transmit to the mixer 32 the second millimeter wave signal S2 transmitted from the transceiver antenna 112.

As shown in FIG. 4, the transceiver front-end module is provided with the signal isolator 34 to isolate the transmitted first millimeter wave signal S1 and the received second millimeter wave signal S2 from each other, so as to prevent an intermodulation interference from occurring.

Figure 5:
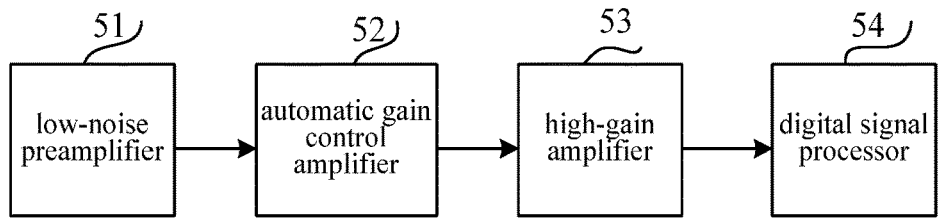
FIG. 5 is a schematic view showing a signal processing module of a gesture identifying unit of a display control circuit in some embodiments of the present disclosure.

In some embodiments of the present disclosure, as shown in FIG. 5, the signal processing module may include: a low-noise preamplifier 51 configured to subject the intermediate-frequency signal to a low noise amplifying process; an automatic gain control amplifier 52 configured to subject the intermediate-frequency signal subjected to the low noise amplifying process to an automatic gain control amplifying process; a high-gain amplifier 53 configured to subject the intermediate-frequency signal subjected to the automatic gain control amplifying process to a high-gain amplifying process; and a digital signal processor 54 configured to detect the gesture within the predetermined range around the display panel based on the intermediate-frequency signal subjected to the high-gain amplifying process, and identify the at least one of the movement direction, the movement speed and the movement distance in regard to the gesture.

An output signal-to-noise ratio may be improved by using low-noise preamplifier 51, thereby improving the performance of the signal processing module, such that the automatic gain control amplifier 52 may modulate the input signals continuously, thereby improving a signal processing capability of the signal processing module. The high-gain amplifier subjects the intermediate-frequency signal outputted by the automatic gain control amplifier 52 to a high-gain amplifying process, so as to meet requirement of the input signal amplitude of the digital signal processor 54. The digital signal processor 54 processes the intermediate-frequency signal subjected to the high-gain amplifying process and transmitted from the high-gain amplifier 53, and identifies, through a module design of software, the at least one of the movement direction, the movement speed and the movement distance in regard to the gesture, so as to control the display panel.

A display device is further provided in some embodiments of the present disclosure, including a display panel and the above display control circuit. The display control circuit is connected to the display panel to control a display of the display panel.

Figure 6:
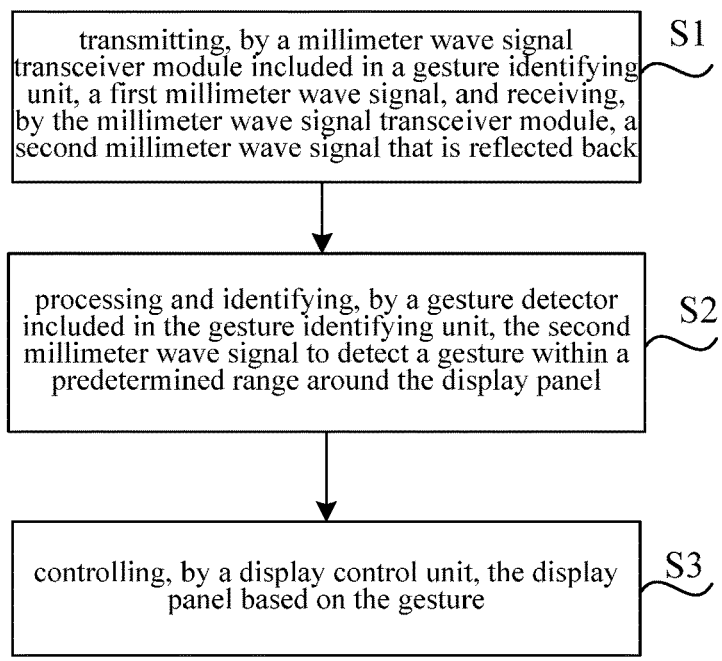
FIG. 6 is a flow chart of a display control method in some embodiments of the present disclosure.

A display control method as shown in FIG. 6 is provided in some embodiments of the present disclosure, including: a millimeter wave signal transceiving step S1 of, transmitting, by a millimeter wave signal transceiver module included in a gesture identifying unit, a first millimeter wave signal, and receiving, by the millimeter wave signal transceiver module, a second millimeter wave signal that is reflected back; a gesture detecting step S2 of, processing and identifying, by a gesture detector included in the gesture identifying unit, the second millimeter wave signal to detect a gesture within a predetermined range around the display panel; and a display controlling step S3 of, controlling, by a display control unit, the display panel based on the gesture.

According to the embodiments of the present disclosure, the display control method is capable of accurately detecting a gesture within a predetermined range around the display panel by using the gesture identifying unit based on the millimeter wave radar technology. As a result, even if being shielded, the gesture identifying unit may still detect the gesture within a predetermined range around the display panel. Therefore, in compared with the related art, the non-contact control of the display panel may be achieved without additionally arranging an unshielded opening on the display panel.

To be specific, the gesture detecting step may further include: identifying, by the gesture detector, at least one of a movement direction, a movement speed and a movement distance in regard to the gesturer.

The display controlling step may further include: controlling, by the display control unit, the display panel based on the at least one of the movement direction, the movement speed and the movement distance in regard to the gesture.

The above are merely the optional embodiments of the present disclosure. It should be noted that, a person skilled in the art may make further modifications and improvements without departing from the principle of the present disclosure, and these modifications and improvements shall also fall within the scope of the present disclosure.

What is claimed is:

1. A display control circuit for controlling a display panel, wherein the display control circuit comprises:
a gesture identifying unit comprising a millimeter wave signal transceiver module and a gesture detection circuit, wherein the millimeter wave signal transceiver module is configured to transmit a first millimeter wave signal and receive a second millimeter wave signal that is reflected back, and the gesture detection circuit is configured to process and identify the second millimeter wave signal, to detect a gesture within a predetermined range around the display panel for the display control circuit to control the display panel based on the gesture.

2. The display control circuit according to claim 1, wherein the display panel is a transparent display panel.

3. The display control circuit according to claim 2, wherein the millimeter wave signal transceiver module comprises a transceiver antenna, and the gesture detection circuit comprises a transceiver front-end module and a signal processing module, wherein
the transceiver front-end module is configured to generate the first millimeter wave signal,
the transceiver antenna is configured to transmit the first millimeter wave signal and receive the second millimeter wave signal that is reflected back,
the transceiver front-end module is further configured to process the second millimeter wave signal to obtain an intermediate-frequency signal, and
the signal processing module is configured to amplify the intermediate-frequency signal and detect the gesture within the predetermined range around the display panel based on the amplified intermediate-frequency signal.

4. The display control circuit according to claim 3, wherein a frequency of the intermediate-frequency signal is larger than or equal to 5 kilohertz, and smaller than or equal to 1 megahertz.

5. The display control circuit according to claim 4, wherein the transceiver front-end module comprises:
a voltage-controlled oscillator configured to generate the first millimeter wave signal in response to an external modulating signal;
a mixer configured to mix the second millimeter wave signal and a local oscillator signal, to obtain a mixed signal; and
a band-pass filter configured to subject the mixed signal to a band-pass filtering process, to obtain the intermediate-frequency signal.

6. The display control circuit according to claim 1, wherein
the gesture detection circuit is further configured to identify at least one of a movement direction, a movement speed, and a movement distance in regard to the gesture for the display control circuit to control the display panel based on the at least one of the movement direction, the movement speed, and the movement distance in regard to the gesture.

7. The display control circuit according to claim 6, wherein the millimeter wave signal transceiver module comprises a transceiver antenna, and the gesture detection circuit comprises a transceiver front-end module and a signal processing module, wherein
the transceiver front-end module is configured to generate the first millimeter wave signal,
the transceiver antenna is configured to transmit the first millimeter wave signal and receive the second millimeter wave signal that is reflected back,
the transceiver front-end module is further configured to process the second millimeter wave signal to obtain an intermediate-frequency signal, and
the signal processing module is configured to amplify the intermediate-frequency signal and detect the gesture within the predetermined range around the display panel based on the amplified intermediate-frequency signal.

8. The display control circuit according to claim 7, wherein a frequency of the intermediate-frequency signal is larger than or equal to 5 kilohertz, and smaller than or equal to 1 megahertz.

9. The display control circuit according to claim 8, wherein the transceiver front-end module comprises:
a voltage-controlled oscillator configured to generate the first millimeter wave signal in response to an external modulating signal;
a mixer configured to mix the second millimeter wave signal and a local oscillator signal, to obtain a mixed signal; and a band-pass filter configured to subject the mixed signal to a band-pass filtering process, to obtain the intermediate-frequency signal.

10. The display control circuit according to claim 1, wherein the millimeter wave signal transceiver module comprises a transceiver antenna, and the gesture detection circuit comprises a transceiver front-end module and a signal processing module, wherein the transceiver front-end module is configured to generate the first millimeter wave signal, the transceiver antenna is configured to transmit the first millimeter wave signal and receive the second millimeter wave signal that is reflected back, the transceiver front-end module is further configured to process the second millimeter wave signal to obtain an intermediate-frequency signal, and the signal processing module is configured to amplify the intermediate-frequency signal and detect the gesture within the predetermined range around the display panel based on the amplified intermediate-frequency signal.

11. The display control circuit according to claim 10, wherein a frequency of the intermediate-frequency signal is larger than or equal to 5 kilohertz, and smaller than or equal to 1 megahertz.

12. The display control circuit according to claim 11, wherein the transceiver front-end module comprises:

a voltage-controlled oscillator configured to generate the first millimeter wave signal in response to an external modulating signal;

a mixer configured to mix the second millimeter wave signal and a local oscillator signal, to obtain a mixed signal; and a band-pass filter configured to subject the mixed signal to a band-pass filtering process, to obtain the intermediate-frequency signal.

13. The display control circuit according to claim 12, wherein the transceiver front-end module further comprises:

a signal isolator, connected to each of the transceiver antenna, the voltage-controlled oscillator and the mixer, and configured to isolate the first millimeter wave signal and the second millimeter wave signal from each other, transmit to the transceiver antenna the first millimeter wave signal transmitted from the voltage-controlled oscillator, and transmit to the mixer the second millimeter wave signal transmitted from the transceiver antenna.

14. The display control circuit according to claim 13, wherein the signal processing module comprises:

a low-noise preamplifier configured to subject the intermediate-frequency signal to a low noise amplifying process;

an automatic gain control amplifier configured to subject the intermediate-frequency signal subjected to the low noise amplifying process to an automatic gain control amplifying process;

a high-gain amplifier configured to subject the intermediate-frequency signal subjected to the automatic gain control amplifying process to a high-gain amplifying process; and a digital signal processor configured to detect the gesture within the predetermined range around the display panel based on the intermediate-frequency signal subjected to the high-gain amplifying process and identify at least one of a movement direction, a movement speed, and a movement distance in regard to the gesture.

15. The display control circuit according to claim 1, wherein the predetermined range is within 1 meter from the display panel.

16. A display device comprising a display panel and the display control circuit according to claim 1.

17. The display device according to claim 16, wherein the gesture identifying unit is arranged at an edge or a corner of the display device.

18. A display control method for controlling a display panel, comprising:

a millimeter wave signal transceiving step of, transmitting, by a millimeter wave signal transceiver module, a first millimeter wave signal, and receiving, by the millimeter wave signal transceiver module, a second millimeter wave signal that is reflected back;

a gesture detecting step of, processing and identifying, by a gesture detection circuit, the second millimeter wave signal to detect a gesture within a predetermined range around the display panel; and a display controlling step of controlling the display panel based on the gesture.

19. The method according to claim 18, wherein the gesture detecting step further comprises: identifying, by the gesture detection circuit, at least one of a movement direction, a movement speed, and a movement distance in regard to the gesture; and the display controlling step further comprises: controlling the display panel based on the at least one of the movement direction, the movement speed, and the movement distance in regard to the gesture.

20. The method according to claim 18, wherein the predetermined range is within 1 meter from the display panel.

* * * * *